United States Patent [19]

Morisawa

[11] 4,181,866
[45] Jan. 1, 1980

[54] PERMANENT MAGNET WITH REDUCED THICKNESS AT THE POLE AREAS FOR SMALL SIZE D-C MOTORS

[75] Inventor: Masanori Morisawa, Kadoma, Japan

[73] Assignee: Matsushita Electric Industrial Co., Ltd., Osaka, Japan

[21] Appl. No.: 907,115

[22] Filed: May 18, 1978

[30] Foreign Application Priority Data

May 26, 1977 [JP] Japan .................................. 52/61977

[51] Int. Cl.² ............................................. H02K 21/12
[52] U.S. Cl. .................................... 310/154; 310/156; 310/266
[58] Field of Search ................. 310/40 MM, 156, 154, 310/266

[56] References Cited

U.S. PATENT DOCUMENTS

| | | | |
|---|---|---|---|
| 2,213,724 | 9/1940 | Vogel | 310/156 |
| 2,736,827 | 2/1956 | Buchmann | 310/156 |
| 2,860,267 | 11/1958 | Hayes | 310/266 |
| 3,102,964 | 9/1963 | Bennett et al. | 310/266 X |
| 3,482,156 | 12/1969 | Porath | 310/156 X |
| 3,532,916 | 10/1970 | Fisher | 310/266 |
| 3,953,752 | 4/1976 | Bannon | 310/156 |
| 4,082,970 | 4/1978 | Girardin | 310/266 X |

*Primary Examiner*—Mark O. Budd
*Attorney, Agent, or Firm*—Joseph W. Farley

[57] ABSTRACT

A cylindrical field magnet for use in small size d-c motors having a coreless armature. The magnet includes magnetic pole portions varying in wall thickness from the interpolar portions and possesses an increased quantity of magnetic flux in its entirety without an increase in its outside diameter.

6 Claims, 14 Drawing Figures

PERMANENT MAGNET WITH REDUCED THICKNESS AT THE POLE AREAS FOR SMALL SIZE D-C MOTORS

The present invention relates to cylindrical field magnets for small size d-c motors having coreless armature.

Small size d-c motors heretofore known include a cylindrical field magnet, which will be described below with reference to FIGS. 1 and 2. Indicated at 1 is a cylindrical field magnet (hereinafter referred to briefly as "magnet"). The magnet 1 has a uniform wall thickness h and is fitted around the cylindrical portion of a resin housing 2. A cup-shaped armature coil 3 having no iron core rotatably surrounds the magnet 1. The coil 3 is covered with resin by molding and thereby held to a shaft 4 along with a commutator 5. Bearing 6, 6' for supporting the shaft 4 are fixedly fitted in the housing 2 coaxially with its center bore. A yoke 7 surrounding the armature coil 3 has one end attached to the housing 2 and the other end provided with a bracket 8 having brushes 9 in sliding contact with the commutator 5. Indicated at 10 is a thrust washer, and at 11 an E-ring.

As will be apparent from the above construction, the bottom end of the cylindrical portion of the housing 2 must provide a seat for the bearing 6' and, moreover, the cylindrical portion needs to have a wall thickness required for the housing to retain its strength. It therefore follows that the inside diameter D of the magnet 1 must be greater than the outside diameter of the bearing 6'. Consequently, when the outside diameter of the motor is limited, the magnet 1 will have a smaller wall thickness than is desired, failing to have sufficient strength against cracking, giving a reduced quantity of magnetic flux in its entirety and producing lower motor output. The reduction in the output is avoidable only with the use of a magnet of increased wall thickness. This invariably leads to an increase in the outside diameter of the motor.

The main object of this invention is to overcome the above problem and to provide a magnet having varying wall thicknesses which enable the magnet to have an increased quantity of magnetic flux in its entirety, thus permitting the motor to produce increased output without resulting in an increase in the outside diameter of the motor.

To fulfil this object, the present invention provides a cylindrical field magnet for use in compact d-c motors having a circular outer periphery and a noncircular inner periphery and including magnetic pole portions varying in wall thickness from the intermediate portions between the pole portions, thereby enabling the magnet to have an increased quantity of magnetic flux in total.

Other features and advantages of this invention will become apparent from the following description of the preferred embodiments of the invention with reference to the accompanying drawings, in which.

Figure 1:
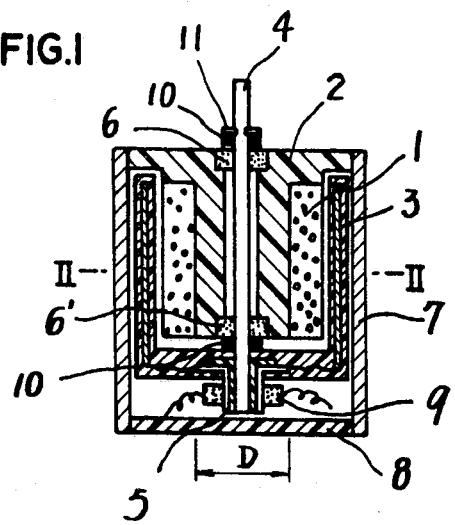
FIG. 1 is a view in section taken along the line I—I in FIG. 2 and showing a small size d-c motor incorporating a conventional field magnet.
Figure 2:
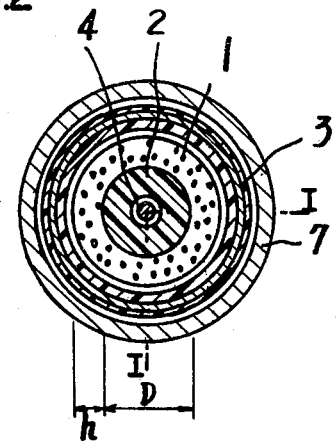
FIG. 2 is a view in section taken along the line II—II in FIG. 1 and showing the same.

Throughout the drawings, like parts are referred to by like reference numerals, and those already described with reference to FIGS. 1 and 2 will not be described.

Figure 3:
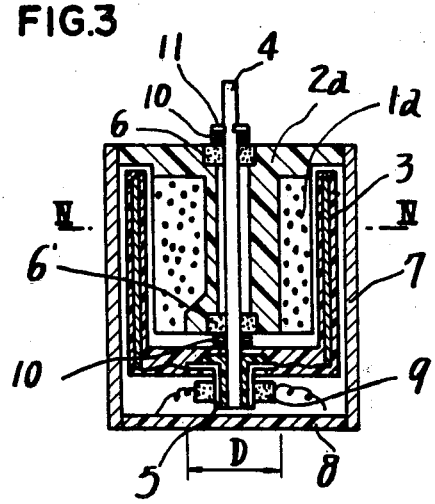
FIG. 3 is a view in section taken along the line III—III in FIG. 4 and showing a compact d-c motor incorporating a field magnet embodying this invention.
Figure 4:
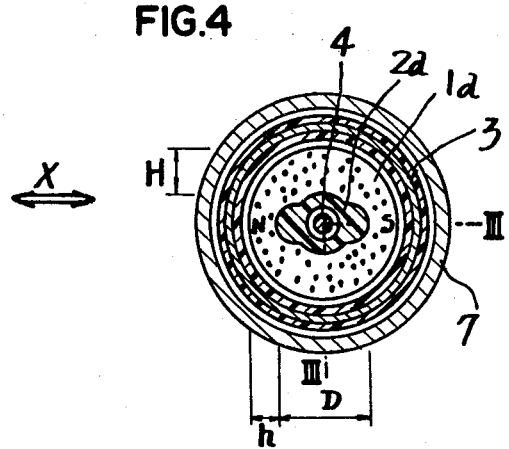
FIG. 4 is a view in section taken along the line IV—IV in FIG. 3 and showing the same.

FIGS. 3 and 4 show a magnet 1a having a circular outer periphery and such an inner periphery that the inside diameter D in the magnetizing direction X and defining the pole portions is the same as in the conventional magnet but the inside diameter defining the intermediate portions between the pole portions is smaller than the diameter D except where the magnet opposes the housing seat portion for the bearing 6'. The interpolar portions therefore have an increased wall thickness H. The magnet 1a is made of magnetic material having a high magnetic permeability such as Alnico 6, 8 or the like.

A housing 2a made of resin is molded integrally with the magnet 1a and has bearings 6 and 6' forced therein.

Figure 5:
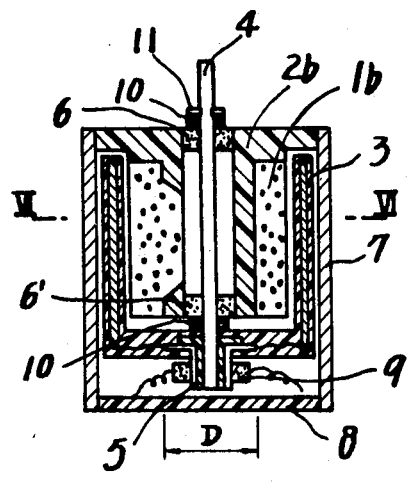
FIG. 5 is a view in section taken along the line V—V in FIG. 6 and showing a compact d-c motor incorporating another field magnet embodying this invention.
Figure 6:
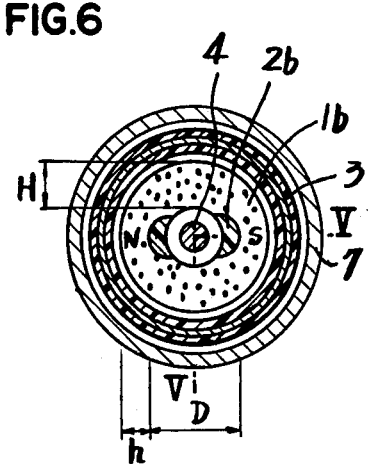
FIG. 6 is a view in section taken along the line VI—VI in FIG. 5 and showing the same.

FIGS. 5 and 6 show another magnet 1b embodying this invention. The portions between the pole portions, except for the opposite end portions, have a reduced inside diameter and an increased wall thickness.

With this construction, the magnet 1b is symmetrically shaped with respect to a horizontal line in FIG. 5, so that the housing 2b is moldable with the magnet 1b without the necessity of positioning the magnet 1b in a particular orientation relative to the housing to be molded. Since the housing does not include the thin wall portion shown in FIG. 3, the resin material can be poured in smoothly when molding. Thus the housing 2b formed has enhanced strength.

The construction illustrated in FIGS. 3 to 4 or FIGS. 5 to 6 has the following advantages.

Figure 7:
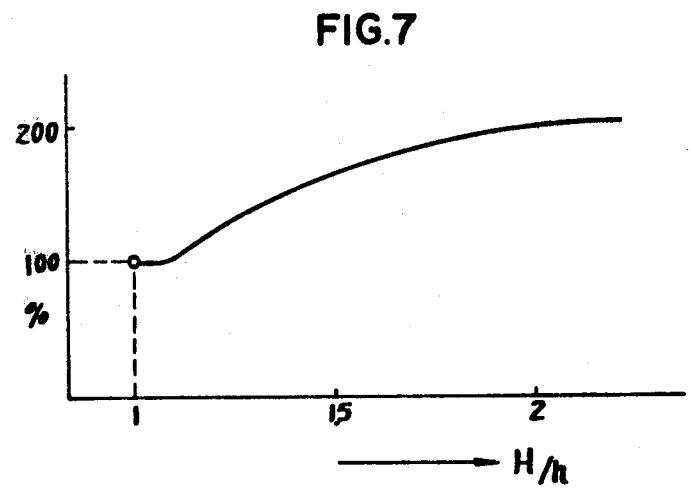
FIG. 7 is a diagram showing magnet characteristics to illustrate the advantage of this invention.

The interpolar portions of the magnet 1a or 1b of material of high magnetic permeability have an increased wall thickness and therefore involve reduced resistance to magnetism, producing an increased quantity of magnetic flux in total as illustrated in FIG. 7. In FIG. 7 the ratio of the great thickness H of the magnet 1a or 1b to the small thickness h thereof is plotted as abscissa vs the total quantity of magnetic flux as ordinate. The ratio H/h of 1 corresponds to the conventional magnet. It is seen that the total quantity of magnetic flux increases with the ratio H/h. This indicates that the quantity of magnetic flux available with a conventional magnet can be provided by a magnet of smaller size according to this invention. The motor can be made compacter, therefore.

While the magnet generally accounts for as high as 20 to 30% of the material cost of motors, this invention ensures a reduction in production cost since a quantity of magnetic flux can be obtained with a smaller amount of magnetic material than conventionally. The reduced resistance of the present magnet to magnetism permits use of a magnetizer of reduced capacity.

Figure 8:
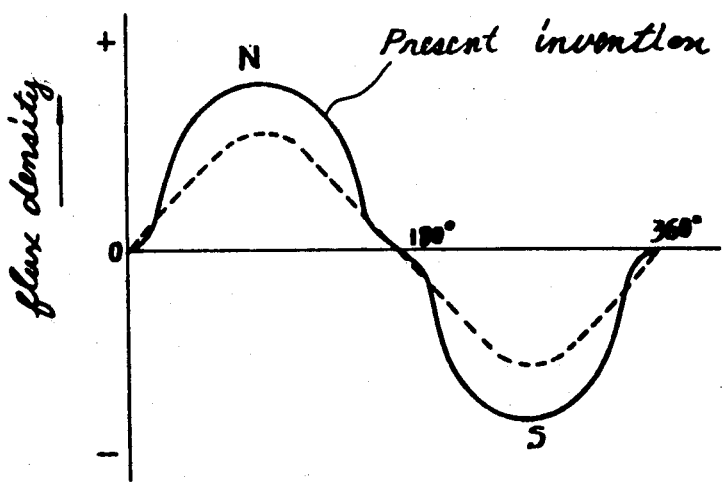
FIG. 8 is a diagram showing the magnetic flux distribution of the field magnet of this invention and that of a conventional field magnet.
Figure 9A:
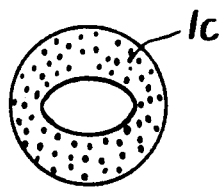
FIGS. 9a, 9b, 9c, 9d and 9e are sectional views showing other field magnets embodying this invention.
Figure 9B:
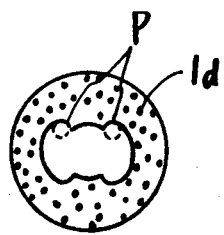
Figure 9C:
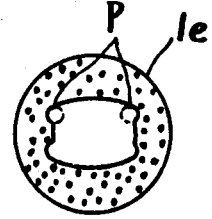
Figure 9D:
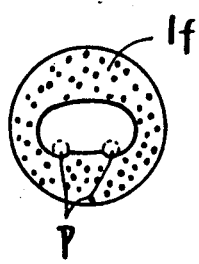
Figure 9E:
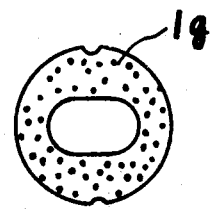
Figure 10:
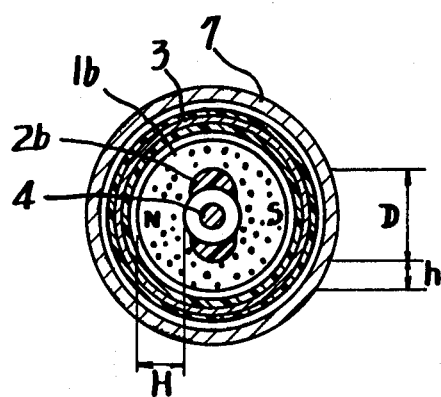
FIG. 10 is a cross sectional view showing a d-c motor incorporating another embodiment of this invention.

In addition to the increased total quantity of magnetic flux, the magnet of this invention has the surface flux distribution indicated in the solid line in FIG. 8 in contrast with that of the conventional magnet shown in broken line in the same drawing. Thus the total current through the motor according to this invention is smaller, and the commutator involves reduced spark, therefore does not require any spark eliminating element, can be produced at a reduced cost and has a longer life.

Usually the housing is made from material which is inexpensive, highly flowable and about 5 to 10 times as high as the magnet in shrinkage, with the result that when the housing molded integrally with the magnet is cooled to room temperature, a clearance occurs between the housing and the inner periphery of the magnet. Consequently the magnet becomes movable relative to the housing without being secured thereto. According to this invention, however, the magnet $1a$ or $1b$ whose inner periphery is not circular but elliptical can be held fixed to the housing $2a$ or $2b$.

FIGS. $9a$ to $9e$ show other magnets embodying this invention. The magnets $1c$ to $1g$ shown have an approximately elliptical inner periphery. The magnets $1d$, $1e$ and $1f$ have at least one projection on its inner peripheral surface, while the magnet $1g$ has recesses in its outer peripheral surface. With these embodiments, pins P can be provided in engagement with the projections or recessed portions to position the magnet correctly with ease relative to the housing during production. These projections or recesses are similarly useful when superposing two or more magnets for the manufacture of an axially elongaged motor. When recesses are formed in the outer peripheral surface of the magnet as in the magnet $1g$, they are formed in the interpolar portions. These embodiments are advantageous in being strengthened as if incorporating a reinforcing rib and are less prone to cracking.

Although the magnets described above are made from material of high magnetic permeability, magnets can be made from material of low magnetic permeability such as ferrite, in which case the inner periphery of the magnet is made to have a reduced diameter at the pole portions and the same diameter as the conventional magnet at the interpolar portions in converse relation to the foregoing embodiments, the pole portions thus having an increased wall thickness. Apparently the magnet of low permeability material thus constructed has the same advantages as the magnets of high permeability material described above.

The cylindrical field magnets of this invention for use in small size d-c motors have a greater wall thickness in the interpolar portions than in the pole portions when made from material of high magnetic permeability, or a greater wall thickness in the pole portions than in the interpolar portions when made from material of low magnetic permeability. The varying wall thicknesses enable the magnet to have an increased quantity of magnetic flux in total without an increase in its outside diameter or in its volume. In fact the magnet of this invention has been found to have a 20% greater quantity of flux in total than a conventional magnet of the same weight. Thus a motor incorporating the magnet of this invention produces greater output than a conventional motor of the same outside diameter. Moreover, the magnet of this invention permits the magnet holding housing to have improved strength.

What is claimed is:

1. A small size d-c motor comprising a resin housing including an end portion having a cylindrical outer periphery and a center portion extending from the end portion to the opposite end of the housing and provided with a bore, a field magnet having an inner periphery surrounding the center portion of the housing and having a generally circular outer periphery, bearings positioned at the ends of the housing and concentric with the bore, a shaft rotatably supported by the bearings, a cup-shaped coreless armature coil secured to the shaft and surrounding the magnet with a space provided therebetween, and a yoke surrounding the armature coil with a space provided therebetween and having one end attached to the outer periphery of the housing, wherein:

the field magnet is made of a magnetic material having a high permeability and is provided with magnetic pole portions and intermediate portions between the pole portions, the inner periphery of the field magnet being formed to provide a greater wall thickness between the inner and outer peripheries at the intermediate portions than at the pole portions.

2. A small size d-c motor as defined in claim 1, wherein the housing is molded integrally with the field magnet.

3. A small size d-c motor as defined in claim 2, wherein the inner periphery of the field magnet is formed with a cylindrical portion at the end thereof adjacent to said opposite end of the housing, said cylindrical portion having a diameter such as to provide a wall thickness less than said greater wall thickness and being engaged by the molded housing to axially interlock the field magnet and housing.

4. A small size d-c motor as defined in claim 1, wherein the inner periphery of the field magnet at at least one end thereof is formed with a cylindrical portion opposed by a seat portion of the housing for one of the bearings positioned therein.

5. A small size d-c motor as defined in claim 4, wherein said one end of the field magnet is located adjacent to said opposite end of the housing.

6. A small size d-c motor as defined in claim 1, wherein the inner periphery of the field magnet at both ends thereof is formed with cylindrical portions opposed by seat portions of the housing for the bearings positioned at the ends thereof.

* * * * *